United States Patent [19]

Ihara et al.

[11] Patent Number: 5,776,419
[45] Date of Patent: Jul. 7, 1998

[54] EXHAUST PURIFYING FILTER MATERIAL AND METHOD FOR MANUFACTURING THE SAME

[75] Inventors: Tomohiko Ihara; Masayuki Ishii; Hiroshi Yoshino, all of Itami, Japan

[73] Assignee: Sumitomo Electric Industries, Ltd., Osaka, Japan

[21] Appl. No.: 555,381

[22] Filed: Nov. 9, 1995

Related U.S. Application Data

[63] Continuation of Ser. No. 293,147, Aug. 19, 1994, abandoned.

[30] Foreign Application Priority Data

Aug. 23, 1993 [JP] Japan ................................. 5-207384
Jul. 1, 1994 [JP] Japan ................................. 6-173481

[51] Int. Cl.⁶ ........................................................ B01D 53/34
[52] U.S. Cl. ........................... 422/177; 422/180; 502/439; 502/527
[58] Field of Search .............................. 422/117, 180, 422/211, 222; 502/439, 527

[56] References Cited

U.S. PATENT DOCUMENTS

| | | | |
|---|---|---|---|
| 4,247,422 | 1/1981 | Davies | 502/314 |
| 4,279,782 | 7/1981 | Chapman et al. | 502/314 |
| 4,382,323 | 5/1983 | Chapman et al. | 29/890 |
| 4,602,001 | 7/1986 | Cyron | 502/439 |
| 4,686,202 | 8/1987 | Broecker | 502/300 |
| 4,918,042 | 4/1990 | Takada et al. | 502/314 |
| 4,931,421 | 6/1990 | Shibata | 502/439 |
| 4,976,932 | 12/1990 | Maeda et al. | 422/240 |
| 5,165,899 | 11/1992 | Delaunay et al. | 422/180 |

FOREIGN PATENT DOCUMENTS

| | | |
|---|---|---|
| 0 232 793 | 8/1987 | European Pat. Off. |
| 0 318 864 | 6/1989 | European Pat. Off. |
| 0 415 835 | 3/1991 | European Pat. Off. |
| 5-3342 | 1/1988 | Japan . |
| 2 063 723 | 6/1981 | United Kingdom . |
| WO92/17691 | 10/1992 | WIPO . |

*Primary Examiner*—Timothy McMahon
*Attorney, Agent, or Firm*—Wenderoth, Lind & Ponack

[57] ABSTRACT

Exhaust purifying filter material which can carry a larger amount of catalyst and from which the catalyst will not easily drop off even if subjected to vibrations or temperature changes due to repeated heating and cooling at high temperatures. Catalyst is carried on alumina whiskers formed on metal fiber having a composition of Fe—Ni—Cr—Al, Fe—Cr—Al or Ni—Cr—Al or woven or unwoven fabric formed of the metal fiber. The catalyst is firmly carried by the alumina whiskers. The amount of catalyst carried is increased with the increase in surface area.

5 Claims, 1 Drawing Sheet

10 μm

10 μm

EXHAUST PURIFYING FILTER MATERIAL AND METHOD FOR MANUFACTURING THE SAME

This application is a Continuation of now abandoned application, Ser. No. 08/293,147, filed Aug. 19, 1994.

BACKGROUND OF THE INVENTION

This invention relates to an exhaust purifying filter material for use in a car exhaust purifying device or a purifying device for a kerosene fan heater and a method of manufacturing such a filter material.

In an exhaust purifying device of a car or a kerosene fan heater, a precious metal (such as platinum) is used as a catalyst to purify exhausts by chemically reacting them with the catalyst. The catalyst is carried on the surface of a carrier such as a honeycomb made of Cordierite.

A conventional catalyst carrier of this type had a relatively smooth surface and was thus low in catalyst-carrying capacity.

Recent car engines and kerosene burners produce high-temperature exhausts compared with older models due to improved fuel combustion technology. When exposed to such high-temperature exhausts, the catalyst carried on a conventional catalyst carrier tends to drop off soon while the heating-cooling cycle is repeated, so that the exhaust-capacity cannot be maintained for a long time.

It is an object of this invention to provide an exhaust purifying filter material which can carry a catalyst stably even if subjected to vibrations or temperature changes due to repeated heating and cooling under a high-temperature condition.

SUMMARY OF THE INVENTION

In order to achieve this object, the filter material for purifying an exhaust gas according to this invention comprises a substrate formed of metal fiber or unwoven fabric (such as felt) or woven fabric (such as net) of the metal fiber, alumina whiskers grown on the surface of the substrate, and a catalyst carried on the alumina whiskers.

The term "unwoven fabric" herein used refers to a thin cloth formed by bonding metal fibers, which are simply aggregated without being formed into yarns, and compressing them. Instead of bonding with adhesive, the metal fibers may be mechanically or otherwise connected together.

If the metal fiber has a composition of an Fe—Ni—Cr—Al, Fe—Cr—Al, or Ni—Cr—Al, alumina whisker should be formed by heating the metal fiber to 800°–1000° C. in the atmosphere or in an oxidizing atmosphere (e.g. in a mixture of Ar and $O_2$ gases).

Metal fiber of Fe—Ni—Cr—Al or Fe—Cr—Al can be obtained by diffusion-alloying a stainless steel SUS316 fiber, an Fe—Cr metal fiber or their woven or unwoven fabric to add Al. The diffusion-alloying (such as calorizing) conditions (powder composition and amount, temperature and time) should be determined so that the Fe—Ni—Cr—Al metal fiber will have a composition (in weight percent) of Ni: 5–20%, Cr: 10–40% and Al: 0.5–15%, the remainder being Fe and inevitable components; and the Fe—Cr—Al metal fiber will have a composition of Cr: 10–40%, and Al: 0.5–15%, the remainder being Fe and inevitable components. For higher heat resistance, one or more rare earth elements such as Y or Nd may be added in the amount of 0.05–0.5% by weight.

Ni—Cr—Al metal fiber is obtainable by diffusion-alloying an Ni metal fiber which is preferably hollow and has a large surface area (such as one obtained by Ni-plating carbon fiber and burning off the carbon fiber), or its woven or unwoven fabric to add Cr and Al. The diffusion-alloying conditions should be determined so that the metal fiber obtained will have a composition of Cr: 10–40 weight % and Al: 0.5–15 weight %, the remainder being Ni and inevitable components. When diffusion-alloying, rare earth elements may be added to improve the heat resistance of the fiber.

The alumina whiskers formed on the surface of the metal fiber substrate will strongly anchor to the substrate. Also, they are so heat-resistant as to withstand temperatures higher than 1000° C.

Such alumina whiskers also serve to roughen the surface of the metal fiber substrate. Namely, the substrate surface will present a complicated three-dimensional configuration. Since the surface has an increased area, it is possible to carry a catalyst more strongly. Thus, the catalyst is less likely to drop off even if subjected to vibrations or temperature changes due to repeated heating and cooling in a high-temperature environment.

A metal fiber formed by alloying Al with Cr forms a stable oxide by the interaction between Al and Cr, so that it is high in both heat resistance and corrosion resistance. Thus, such a metal fiber is less likely to suffer heat degradation and corrosion even if exposed to high-temperature exhausts.

Since the metal fiber substrate has a complicatedly entangled surface, it can carry a greater amount of catalyst and thus has an increased capacity to physically collect solids in exhausts. Unwoven or woven fabric formed of hollow fiber (preferably 10–40 μm diameter) has a porous structure having minute pores and thus has an extremely large surface area. Such unwoven or woven fabric has especially high capacity to collect solid contents in exhausts.

We shall now explain the reasons why the compositions of the three kinds of metal fiber are limited.

Cr is a basic element needed to assure heat resistance and oxidation resistance. According to the present invention, oxidation resistance is provided mainly by the provision of an alumina ($Al_2O_3$) film. If the Cr content is low, however, the adhesion and protection properties of this film will decrease, making it difficult to maintain the oxidation resistance. On the other hand, if the Cr content is excessive, the toughness tends to decrease. If the Cr content is 10–40% by weight, the metal fiber is free of either of these problems.

For sufficient heat resistance, it is also necessary to contain at least 0.5% by weight of Al. If the Al content is less than 0.5% by weight, heat resistance will improve little. If more than 15% by weight of Al, workability will be poor. Thus, the Al content should be determined to a suitable value within the range between 0.5 and 15% by weight, taking into account the required workability.

In subjecting the base metal to what is known as the calorizing, in which Al powder is diffused into the base metal, it is possible to adjust the composition of the metal so that the Al content will be higher near the surface of the fiber. The surface of the fiber thus formed shows higher heat resistance. But even in this case, the weight ratio of Al to the entire alloy should be limited within the range from 1% to 15% at the most. Addition of more than 15% by weight of Al would lower the toughness of the alloy so markedly that the alloy is likely to get cracked due to impacts and vibrations.

It is possible to diffuse Al into metal fiber to a desired depth by controlling the temperature and time of the calorizing. On the other hand, the higher the Al content near the surface of the base metal to be heat-treated, the more the alumina whiskers will grow and the larger their aspect ratio (the length-to-thickness ratio). Thus, the Al content should be higher near the surface of the metal fiber and, inside the alloy, it should be a level barely enough to ensure heat resistance (1% by weight).

If a larger aspect ratio of the alumina whiskers is desired, the Al content should be increased to 5% or higher in the region from the fiber surface to the depth of 1.0 μm. The Al content near the surface of the metal fiber can be controlled to a desired level e.g. by forming an Al-concentrated portion near the surface of a SUS316 or Fe—Cr metal fiber by calorizing, or by providing a pure Al coating on the surface of metal fiber by vapor phase plating such as vacuum deposition or by wet plating and then subjecting the material to diffusion treatment in an inert atmosphere.

It is possible to further increase the heat resistance of Fe—Ni—Cr—Al, Fe—Cr—Al, and Ni—Cr—Al metals by adding thereto one or more rare earth elements such as Y or Nd. Such rare earth elements may be added by mixing them in powder form into the material to be powder-diffused. If rare earth elements are added by more than 0.5% by weight, they will impair the growth of whiskers in the later stage. If less than 0.05% by weight, the heat resistance will not improve.

The temperature when growing alumina whiskers in the atmosphere or in an oxidizing atmosphere should be within 800°–1000° C. to obtain whiskers having a high aspect ratio. In order to obtain whiskers having a high aspect ratio (1:2 or higher), the temperature should be between 850° and 950° C. At 850° C., it takes at least 10 hours to grow desired alumina whiskers. At 950° C., the same results are achievable in two hours. If the whisker growing temperature is higher than 1000° C., the surface of the oxide film formed tends to be nearly smooth. Such a surface is small in specific area, so that it is impossible to carry a large amount of catalyst on the alumina whiskers. If less than 800° C., oxidation tends to lag due to a delay in atomic diffusion, so that it takes a long time to grow whiskers to a desired amount.

According to this invention, alumina whiskers are grown on the surface of a metal fiber made of an Fe—Ni—Cr—Al, Fe—CR—Al or Ni—Cr—Al composition, or unwoven or woven fabric formed of such metal fiber. Since a catalyst is carried on the alumina whiskers thus formed, it can be carried firmly thereon. Thus, the catalyst will not easily drop off even when subjected to vibrations or temperature changes due to repeated heating and cooling in a high-temperature atmosphere.

The filter material using substrate formed of woven or unwoven fabric of metal fiber has an especially large surface area due to its fairly thick porous structure and due to the alumina whiskers formed thereon. Thus, such a filter material shows an exceptionally high catalyst-carrying capacity, so that the catalyst carried thereon will reveal exhaust purifying effects strongly for a prolonged period of time.

Other features and objects of the present invention will become apparent from the following description made with reference to the accompanying drawings, in which:

DETAILED DESCRIPTION OF THE PREFERRED EMBODIMENT

Figure 1:
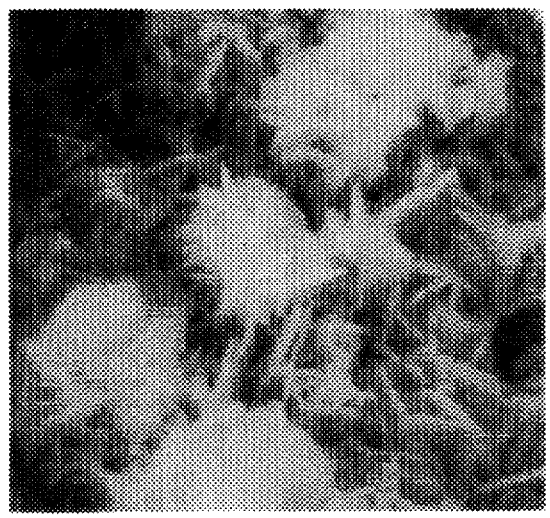
FIG. 1 is a scanning electron microscopic photograph showing one example of the surface of the metal fiber of the exhaust purifying filter material (before carrying a catalyst) according to this invention

We will now describe several examples according to this invention.

(Example 1)

An unwoven fabric formed of stainless steel SUS316 having a diameter of 30 μm was subjected to diffusion-alloying to form a material having a composition of Fe—Ni (14% by weight)-Cr (16% by weight)-Al (8% by weight). This material was heated for five hours at 900° C. in the atmosphere to grow alumina whiskers on the metal surface. Then, a catalyst was carried on the whiskers by a wet process to obtain an exhaust purifying filter material (Article 1 of the invention).

For comparison, we also prepared another filter material by heating the metal fiber obtained by alloying in the same manner as with Article 1 and having the same composition as Article 1 for three hours at 1050° C. and carrying a catalyst thereon by a wet method (Comparative Specimen 1). FIG. 1 shows a scanning electron microscopic photograph of the substrate surface of Article 1 before carrying a catalyst thereon. As is apparent from this figure, the surface of the base metal is covered thickly with alumina whiskers about 3 μm long. No whiskers as shown in FIG. 1 were observed on the metal surface of Comparative Specimen 1. Instead, its surface was covered with crystal grains.

We then measured the amounts of platinum-palladium catalyst that could be carried on the respective specimens. It turned out that Article 1 was capable of carrying much greater amount of catalyst than Comparative Specimen 1.

(Example 2)

Unwoven fabric formed of Ni fiber (hollow fiber 40 μm in diameter) containing Ni at the rate of about 1100 g/m² was subjected to diffusion-alloying to obtain specimens having compositions shown in Table 1. The fabrics thus formed were heated in a mixture of Ar and $O_2$ gases with the partial pressure of $O_2$ kept constant at 20% while setting the temperatures and times for heat treatment as shown in Table 1. A platinum-rhodium catalyst was carried on these specimens by the wet process to obtain filter materials according to the present invention (Articles 2–9).

For comparison, we also prepared other filter materials by heating the metal fiber having the same compositions as Articles 2–9, at temperatures below 750° C. or over 1050° C. and carrying a catalyst thereon by a wet method (Comparative Specimens 2–9).

We also prepared additional comparative specimens, which were formed under the same heat treatment conditions as with the Articles according to the present invention but contained not less than 0.5% by weight of Y or Nd.

The surfaces of the metal fiber substrates of Articles 2–9 were covered with alumina whiskers 0.2–0.3 μm thick and 1–5 μm long. No similar whiskers were observed on Comparative Specimens 2–9. Instead, they were covered with smooth crystals.

In case of the specimens that contain more than 0.5% by weight of Y or Nd, whiskers obtained were shorter than 1 μm or were present in the form of crystal grains even though the heat treatment conditions were the same as with Articles according to the present invention. It follows from this fact that excessive amount of rare earth elements impairs, rather than promotes, the growth of whiskers.

Articles 2–9 were alternately heated and cooled 500 times, one cycle consisting of heating at 1000° C. for 30 minutes and cooling. The catalysts never dropped nor chipped off. Also, there was no change in their outer appearance. In contrast, Comparative Specimens were not only lower in the catalyst-carrying capacity, but also the catalysts dropped off before the heating/cooling cycle was repeated 500 times. Such materials are not suitable as exhaust purifying filter materials.

(Example 3)

In this Example, unwoven fabric formed by mixing fibers of SUS430 (Cr: 16–18% by weight, the remainder being Fe and inevitable components) having a diameter of 20–40 μm were subjected to diffusion-alloying treatment to obtain a material having a composition of Fe—Cr (16% by weight) -Al (5% by weight). This material was heated in the atmosphere at 1000° C. for three hours to grow alumina whiskers on the metal surface. Then, γ-alumina and a catalyst were carried thereon by a wet process to obtain an exhaust purifying filter material (Article 10 of the present invention).

For comparison, we also prepared Comparative Specimen 10 which was formed by heating a metal unwoven fabric having the same composition as the above-mentioned fabric at 1050° C. for one hour and carrying thereon a catalyst and γ-alumina by a wet process.

Both specimens were observed to see how alumina whiskers grew and examined for their catalyst-carrying capacities. Article 10 had sufficiently dense alumina whiskers. On Comparative Specimen 10, no whiskers were observed and its γalumina- and catalyst-carrying capacity was less than one-tenth that of Article according to the present invention.

TABLE 1

| | Composition (wt %) | | | | Heat treatment conditions | |
|---|---|---|---|---|---|---|
| | Cr | Al | Y | Nd | Ni and inevitable component | Temp. (°C.) | Time (hour) |
| Article 2 | 35 | 1 | | | Remainder | 800 | 20 |
| Article 3 | 16 | 15 | | | Remainder | 900 | 5 |
| Article 4 | 18 | 6 | 0.05 | | Remainder | 1000 | 1 |
| Article 5 | 18 | 5 | 0.1 | | Remainder | 950 | 3 |
| Article 6 | 25 | 8 | | 0.1 | Remainder | 950 | 6 |
| Article 7 | 15 | 5 | 0.4 | 0.05 | Remainder | 950 | 4 |
| Article 8 | 20 | 5 | 0.1 | 0.4 | Remainder | 850 | 3 |
| Article 9 | 18 | 5 | 0.05 | 0.4 | Remainder | 850 | 7 |

What is claimed is:

1. A filter material for purifying an exhaust gas comprising a substrate in the form of an unwoven fabric of a hollow metal fiber having a diameter of 10–40 μm, said metal fiber comprising 5–20% by weight of Ni, 10–40% by weight of Cr, and 5–15% by weight of Al, the remainder being Fe and residual impurities, the content of said Al being higher near the surface of said metal fiber than the inner portion of said metal fiber, alumina whiskers grown on the surface of said substrate, and a catalyst carried on said alumina whiskers.

2. A filter material for purifying an exhaust gas comprising a substrate in the form of an unwoven fabric of a hollow metal fiber having a diameter of 10–40 μm, said metal fiber comprising 10–40% by weight of Cr, and 1–15% by weight of Al, the remainder being Ni and residual impurities, the content of said Al being higher near the surface of said metal fiber than the inner portion of said metal fiber, alumina whiskers grown on the surface of said substrate, and a catalyst carried on said alumina whiskers.

3. A filter material for purifying an exhaust gas as claimed in claims 1 or 2 wherein said hollow metal fiber further contains at least one element selected from the group consisting of Y and Nd in the amount of 0.05–0.5% by weight.

4. A method of manufacturing said filter material as claimed in claims 1 or 2 comprising the steps of forming an unwoven fabric of a hollow metal fiber not containing Al, adding Al to said fabric by diffusing to provide an Al-rich surface layer on said fabric, heating said fabric to a temperature of 800°–1000° C. in an oxidizing atmosphere to grow alumina whiskers on the surface of the fabric, and carrying a catalyst on said alumina whiskers.

5. A method of manufacturing said filter material as claimed in claim 3 comprising the steps of forming an unwoven fabric of a hollow metal fiber not containing Al, adding Al to said fabric by diffusing to provide an Al-rich surface layer on said fabric, heating said fabric to a temperature of 800°–1000° C. in an oxidizing atmosphere to grow alumina whiskers on the surface of the fabric, and carrying a catalyst on said alumina whiskers.

* * * * *